United States Patent
Di Giusto et al.

(10) Patent No.: US 9,079,604 B2
(45) Date of Patent: Jul. 14, 2015

(54) ELECTRICAL POWER-STEERING SYSTEM FOR A MOTOR-VEHICLE

(71) Applicant: FIAT GROUP AUTOMOBILES S.P.A., Turin (IT)

(72) Inventors: Nevio Di Giusto, Cumiana (IT); Giorgio Cornacchia, Turin (IT)

(73) Assignee: FIAT GROUP AUTOMOBILES S.p.A., Turin (IT)

( * ) Notice: Subject to any disclaimer, the term of this patent is extended or adjusted under 35 U.S.C. 154(b) by 0 days.

(21) Appl. No.: 14/166,377

(22) Filed: Jan. 28, 2014

(65) Prior Publication Data

US 2014/0209407 A1  Jul. 31, 2014

(30) Foreign Application Priority Data

Jan. 28, 2013 (IT) ................. TO2013A0066

(51) Int. Cl.
- *B62D 3/12* (2006.01)
- *B62D 5/04* (2006.01)
- *B62D 7/09* (2006.01)
- *B62D 6/00* (2006.01)

(52) U.S. Cl.
CPC ............. *B62D 5/0403* (2013.01); *B62D 3/126* (2013.01); *B62D 5/046* (2013.01); *B62D 5/0421* (2013.01); *B62D 5/0463* (2013.01); *B62D 6/002* (2013.01); *B62D 7/09* (2013.01)

(58) Field of Classification Search
CPC ...... B62D 5/003; B62D 5/0403; B62D 5/046; B62D 5/0463; B62D 5/22; B62D 7/09; B62D 3/12; B62D 3/126
See application file for complete search history.

(56) References Cited

U.S. PATENT DOCUMENTS

| | | | |
|---|---|---|---|
| 4,741,409 A | | 5/1988 | Westercamp et al. |
| 4,992,944 A | * | 2/1991 | Noto et al. ................ 701/41 |
| 6,345,681 B1 | * | 2/2002 | Hackl et al. ................ 180/402 |

(Continued)

FOREIGN PATENT DOCUMENTS

| | | | |
|---|---|---|---|
| DE | 10 2008 021 849 A1 | 11/2009 | |
| EP | 1375300 A2 * | 1/2004 | ............ B62D 5/04 |

OTHER PUBLICATIONS

Italian Search Report for Priority Application No. TO 2013 A 000066, dated Oct. 23, 2013.

*Primary Examiner* — Joseph Rocca
*Assistant Examiner* — Maurice Williams
(74) *Attorney, Agent, or Firm* — Heslin Rothenberg Farley & Mesiti P.C.; Victor A. Cardona

(57) ABSTRACT

An electrical power-steering system for motor-vehicles includes a first pinion and a second pinion meshing with two portions of a rack member which controls the steering angle of the wheels. The two pinions are driven by respective electric motors which are in turn controlled by an electronic control unit. The two portions of the rack member are constituted by two separate elements connected to each other by a connection member interposed therebetween, such that the first and second portions of the rack member behave like a single rigid element when they are driven with identical displacements in a steering maneuver, whereas the connection member allows for a relative movement in the longitudinal direction of the first and second portions of the rack member, with a resulting lengthening or shortening of the rack member, when the first and second portions of the rack member are driven with differentiated displacements in an operative mode for adjustment of the convergence angle of the wheels.

3 Claims, 2 Drawing Sheets

(56) References Cited

U.S. PATENT DOCUMENTS

| | | | |
|---|---|---|---|
| 6,505,700 B2 * | 1/2003 | Furumi et al. | 180/412 |
| 6,929,086 B1 * | 8/2005 | Husain et al. | 180/413 |
| 7,308,964 B2 * | 12/2007 | Hara et al. | 180/446 |
| 8,789,647 B2 * | 7/2014 | Hwang et al. | 180/444 |
| 2001/0032762 A1 * | 10/2001 | Weisgerber | 188/266 |
| 2004/0026158 A1 * | 2/2004 | Rieth et al. | 180/402 |
| 2005/0257992 A1 | 11/2005 | Shiino et al. | |
| 2006/0278466 A1 * | 12/2006 | Cheng | 180/444 |

* cited by examiner

ELECTRICAL POWER-STEERING SYSTEM FOR A MOTOR-VEHICLE

CROSS REFERENCE TO RELATED APPLICATIONS

This application claims priority to Italian application No. TO 2013 A 000066 filed on Jan. 28, 2013, the entire disclosure of this application being hereby incorporated herein by reference.

TECHNICAL FIELD

The present invention relates to an electrical power-steering system for a motor-vehicle, of the type comprising:
- a driving shaft connected or adapted to be connected to the steering column of the motor-vehicle;
- a first pinion driven by said driving shaft and meshing with a first portion of a rack member provided for controlling the steering angle of two wheels of the motor-vehicle;
- a first electric motor connected to said driving shaft, for applying thereto a steering-assist torque;
- electronic control means for controlling said first electric motor on the basis of an input signal depending upon the torque and/or the angle of rotation of the steering column;
- a second pinion meshing with a second portion of said rack member; and
- a second electric motor that drives said second pinion and that is also controlled by said electronic control means.

BACKGROUND ART

Electrical power-steering systems of the type referred to above are disclosed for example in DE 10 2008 021849 A1 and US 2005 0257992 A1. In these known solutions having two pinions and two electric motors associated thereto for actuating the rack member, the system is of a fail-safe type, since if one of the two electric motors is not in order the other motor ensures one half of the assist power. U.S. Pat. No. 4,741,409 discloses a device with two electric motors and two pinions that actuate two separate rack elements that are either completely independent from one another or are rigidly connected together in the case where one of the motors has a breakdown.

BRIEF SUMMARY OF INVENTION

The object of the present invention is to improve the aforesaid known systems, while providing the possibility of an additional operating mode for controlling the angle of convergence of the wheels of the vehicle.

With a view to achieving the above object, the subject of the present invention is an electrical power-steering system that has all the characteristics that have been specified above and is further characterized in that said first portion and said second portion of the rack member that mesh with said first and second pinions are respectively associated to said two wheels of the motor-vehicle and are constituted by two separate elements connected to each other by a connection member interposed therebetween, such that said first and second portions of the rack member behave like a single rigid element when they are driven with identical displacements in a steering manoeuvre of the vehicle, whereas said connection member allows for a relative movement in the longitudinal direction of said first and second portions of the rack member, with a resulting lengthening or shortening of said rack member, when said first and second portions of the rack member are driven with differentiated displacements in an operative mode for adjustment of the angle of convergence of said wheels;

said system being further characterized in that said electronic control means are configured for driving said first and second pinions identically during a steering manoeuvre of the vehicle, in such a way as to cause identical longitudinal movements of said first and second portions of the rack member, whereby during the steering manoeuvre said portions of the rack member behave like a single rigid element; and in that said electronic control means are further configured for driving said first and second pinions in a differentiated way, with the vehicle stationary or in motion, in the operative mode for adjustment of the convergence angle of said wheels, so as to cause a mutual longitudinal displacement of said first and second portions of the rack member, with a resulting lengthening or shortening of said rack member, which causes a variation in the convergence angle of said wheels.

In the preferred embodiment, said connection member is an elastic connection member and said first and second portions of the rack member have adjacent ends that are coupled together by said connection member and have cooperating stop surfaces that define the minimum longitudinal extension and the maximum longitudinal extension of the rack member.

In this embodiment, preferably said elastic connection member is a body made of elastomeric material connected to both said adjacent ends of the first and second portions of the rack member, and having a stiffness sufficient for rigidly coupling said portions when they are driven with identical longitudinal movements, but allowing for relative movements in the longitudinal direction of the two portions of the rack member in the aforesaid mode for adjustment of the wheel convergence.

In an alternative embodiment, the connection member could comprise a spring.

Preferably, the above electronic control means are configured for controlling an adjustment of the angle of convergence of the wheels also when the vehicle is travelling, on the basis of one or more parameters indicating the operating conditions of the vehicle.

The invention also provides a method for controlling the stability of a vehicle while it is travelling, wherein an electrical power-steering system is provided having the characteristics referred to above and wherein the electronic control means are used for varying the relative longitudinal position of the two portions of the rack member, so as to vary dynamically the convergence angle of the wheels while the vehicle is travelling, on the basis of one or more parameters indicating the operating conditions of the vehicle.

BRIEF DESCRIPTION OF THE DRAWING FIGURES

Further characteristics and advantages of the invention will emerge from the ensuing description with reference to the annexed drawings, which are provided by way of non-limiting example and in which.

DETAILED DESCRIPTION

Figure 1:
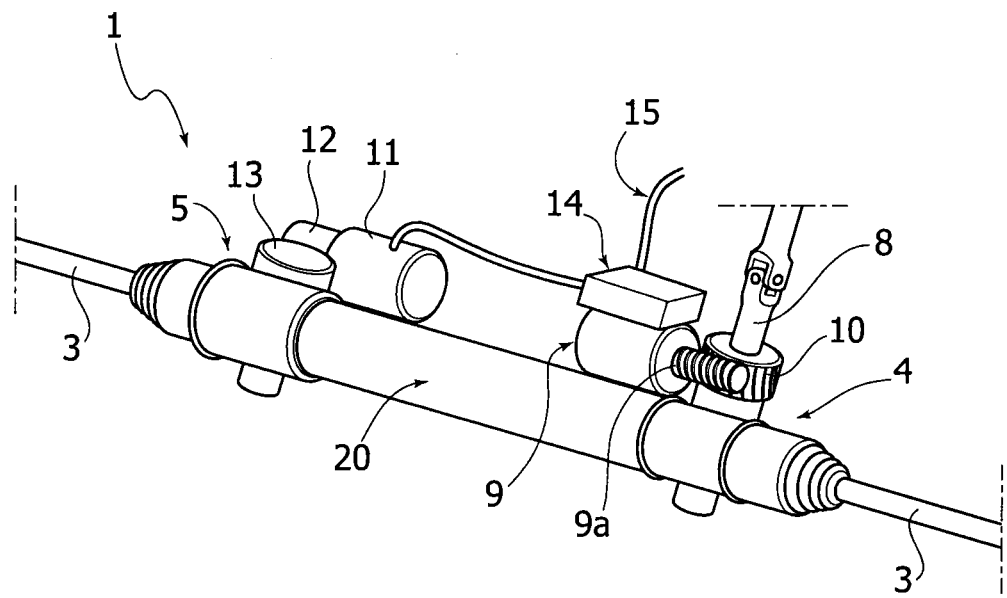
FIG. 1 is a diagrammatic perspective view of an embodiment of the electrical power-steering system according to the invention.
Figure 2:
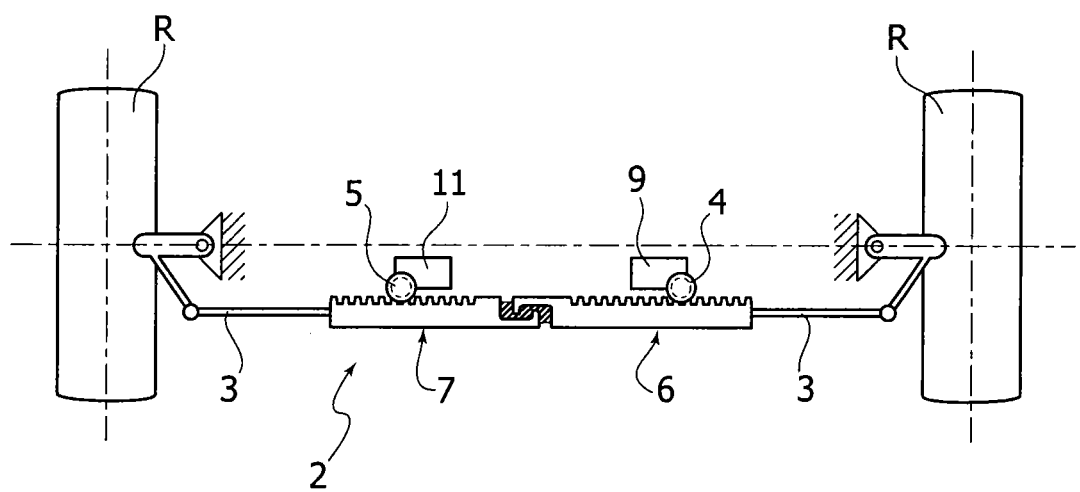
FIG. 2 is a further diagrammatic plan view of the system of FIG. 1.

With reference to the drawings, numeral 1 generally designates an electrical power-steering system for motor-vehicles comprising a rack member 2 (see FIG. 2), whose opposite ends are connected to the supports of two wheels R of the motor-vehicle by tie-rods 3, according to the conventional technique. In FIG. 1, reference numeral 20 designates the casing in which the rack member 2 is slidably guided and from which tie-rods 3 project, for connection to wheels R.

System 1 comprises a first pinion 4 and a second pinion 5 (FIG. 2) respectively meshing with a first portion 6 and a second portion 7 of rack member 2. The first pinion 4 is associated to a driving shaft 8 (FIG. 1) connected to the steering column of the motor vehicle (not visible in the drawings). According to a technique known per se, rotation of the first pinion 4 is assisted by a first electric servomotor 9, whose output shaft is operatively connected to shaft 8. In the example illustrated, this is obtained by the engagement between a worm-screw 9a driven by electric motor 9 and a helical gear 10 associated to shaft 8.

Like the first pinion 4, also the second pinion 5 is assisted by a second electric motor 11 that drives in rotation a worm-screw 12 meshing with a helical gear 13, which is rotatably connected with second pinion 5.

Both first electric motor 9 and second electric motor 11 are controlled by an electronic control unit 14 on the basis of input signals sent to the electronic unit 14 via a cable 15 by sensor means of any known type (not illustrated) arranged to detect the torque and/or the angle of rotation of the steering column.

All the constructional details regarding the components that have been mentioned above are not described herein in so far as they can be made in any known way and do not fall, taken alone, within the scope of the present invention. Furthermore, the annexed drawings can thus be rendered more simple and readily understandable.

The main characteristic of the present invention lies in that the two portions 6, 7 of the rack member 2 respectively meshing with the first pinion 4 and the second pinion 5, are constituted by two separate elements, which are connected to each other by a connection member 16 interposed therebetween, such that the portions 6, 7 of the rack member 2 behave like a single rigid element when they are driven with identical displacements in a steering manoeuvre of the vehicle, whereas the connection member 16 allows for a relative movement in the longitudinal direction of portions 6, 7 of the rack member 2, with a resulting lengthening or shortening of the rack member 2, when the portions 6, 7 of the rack member are driven with differentiated displacements in an operative mode for adjustment of the angle of convergence of wheels R.

Thanks to the above characteristic, the two pinions 4, 5 respectively meshing with the two portions 6, 7 of the rack member 2, can be controlled either identically, according to the conventional technique, in a steering manoeuvre, or in a differentiated way in the aforesaid operative mode, in which a lengthening or shortening of the rack member 2 is caused, in order to provide a variation of the angle of convergence of the two wheels R. The electronic control unit 14 is thus configured to perform both of the aforesaid functions.

The difference between the value of the maximum longitudinal extension and the value of the minimum longitudinal extension of the rack member may be relatively small, for example in the region of 3-5 mm.

In the steering mode, the two rack portions always behave as a single rigid element, whereas in the mode for adjustment of the wheel convergence, which—as will be discussed hereinafter—can be implemented with the vehicle stationary or in motion, the rack portions slightly displace longitudinally relative to each other, to adjust the overall length of the rack.

The operating mode for adjustment of the angle of convergence of the wheels can be activated either with the vehicle stationary, in order to obtain a desired angle of convergence for the wheels R, or with the vehicle moving, to obtain a dynamic adjustment of the angle of convergence during movement of the vehicle, on the basis of the output signals coming from one or more sensors provided for detecting the conditions of travel of the vehicle and/or on the basis of predetermined control strategies which can be selected by the driver ("Sport", "Comfort", "Snow", etc.).

Naturally, variation of the angle of convergence may be obtained either by operating electric motors 9, 11 at different speeds or by operating even only one of them.

As referred to above, the two elements forming the portions 6, 7 of the rack member are connected together by a connection member 16 able to couple said elements together with respect to the identical longitudinal movements, during the manoeuvres of steering of the vehicle, while allowing for a mutual longitudinal displacement between these elements in the operating mode for adjustment of the angle of convergence of the wheels. Furthermore, the two elements 6, 7 are configured with stop surfaces that define the end positions of maximum lengthening and maximum shortening of the rack member 2.

Figure 3:
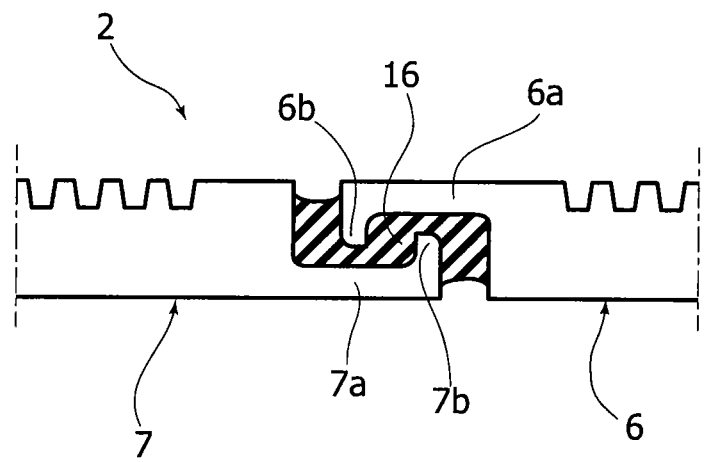
FIG. 3 illustrates a detail of FIG. 2 at an enlarged scale.

FIG. 3 diagrammatically illustrates an examplary embodiment in which the adjacent ends of the two elements 6, 7 are connected together by a body 16 made of elastomeric material, for example rubber vulcanized directly on the metal body of the elements 6, 7. The body 16 has a stiffness sufficiently high as to enable a rigid coupling of the elements 6, 7 with respect to identical longitudinal movements, but sufficiently low as to enable small longitudinal relative movements of these elements during the mode of operation for adjustment of the angle of convergence of the wheels. Furthermore, as may be seen in FIG. 3, the adjacent ends of the elements 6, 7 have front projections 6a, 7a set alongside one another and terminating with appendages 6a, 7b, designed to define stop surfaces that define the configurations of maximum lengthening and maximum shortening of the rack member 2.

Figure 4:
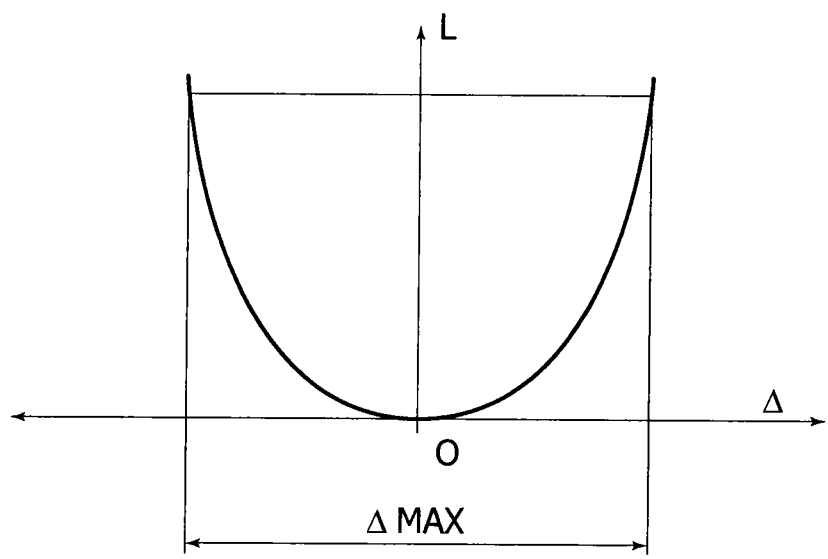
FIG. 4 is a diagram showing the mode of operation of the system according to the invention.

FIG. 4 illustrates a diagram in which the longitudinal load L that the body made of elastomeric material 16 undergoes is plotted as a function of the longitudinal displacement $\Delta$ of the two elements 6, 7. The maximum lengthening $\Delta_{MAX}$ is in the region of 3-5 mm.

In addition to the advantages that have been described above, the system according to the invention preserves of course also the advantages characteristic of the known solutions with double pinion, amongst which the fact of being able in any case to guarantee assistance to the steering manoeuvre also in the case where one of the two electric motors breaks down. In the case of breakdown of both of the motors, operation with purely manual control is in any case ensured.

The power of the two motors is approximately half of that envisaged in system using a single motor. It is thus possible to use two low-power electric motors. The supply voltage of the motors may moreover be 12 V, without any need to adopt higher voltages, for example 48 V, as is instead necessary in some known solutions with a single electric motor.

Naturally, without prejudice to the principle of the invention, the details of construction of the embodiments described and illustrated herein by way of example may vary widely, without thereby departing from the scope of the present invention.

What is claimed is:

1. An electrical power-steering system for a motor-vehicle, comprising:

a driving shaft connected or adapted to be connected to a steering column of the motor-vehicle;

a first pinion driven by said driving shaft and meshing with a first portion of a rack member provided for controlling a steering angle of two wheels of the motor-vehicle;

a first electric motor connected to said driving shaft, for applying thereto a steering-assist torque;

electronic control means for controlling said first electric motor based on an input signal indicating a torque and/or an angle of rotation of the steering column;

a second pinion meshing with a second portion of the rack member; and a second electric motor that drives said second pinion and that is controlled by said electronic control means;

said first portion and said second portion of the rack member that mesh with said first and second pinions respectively associated to said two wheels of the motor-vehicle and comprise two separate elements connected to each other by a connection member interposed therebetween, such that said first and second portions of the rack member move together when they are driven with identical displacements in a steering maneuver of the vehicle, whereas said connection member allows for a relative movement in a longitudinal direction of said first and second portions of the rack member, with a resulting lengthening or shortening of said rack member, when said first and second portions of the rack member are driven with differentiated displacements in an operative mode for adjustment of an angle of convergence of said wheels;

said electronic control means configured for driving said first and second pinions identically during a steering maneuver of the vehicle, in such a way as to cause identical longitudinal movements of said first and second portions of the rack member, whereby during the steering maneuver said portions of the rack member move together; and said electronic control means configured for driving said first and second pinions in a differentiated way, with the vehicle stationary or in motion, in the operative mode for adjustment of the convergence angle of said wheels, so as to cause a mutual longitudinal displacement of said first and second portions of the rack member, with a resulting lengthening or shortening of said rack member, which causes a variation in the convergence angle of said wheels;

said connection member being an elastic connection member and said first and second portions of the rack member having adjacent ends that are coupled together by said connection member and have cooperating stop surfaces that define a minimum longitudinal extension and a maximum longitudinal extension of the rack member; and said elastic connection member being a body made of elastomeric material connected to both said adjacent ends of the first and second portions of the rack member, and having a stiffness sufficient for rigidly coupling said portions when they are driven with identical longitudinal movements, but allowing for relative movements in the longitudinal direction of the two portions of the rack member in the mode for adjustment of the wheel convergence.

2. The electrical power-steering system according to claim 1, wherein said electronic control means are configured for controlling an adjustment of the convergence angle of the wheels also when the vehicle is travelling, based on one or more parameters indicating operating conditions of the vehicle and/or based on predetermined control strategies which can be selected by a driver.

3. A method for controlling a motor-vehicle when it is travelling, wherein an electrical power-steering system is provided according to claim 1, wherein, when the vehicle is travelling, said electronic control means are used for driving a relative longitudinal movement of said first and second portions of the rack member in such a way as to vary the angle of convergence of the wheels dynamically, while the vehicle is travelling, based on one or more parameters indicating operating conditions of the vehicle and/or based on predetermined control strategies which can be selected by a driver.

* * * * *